(12) United States Patent
Takenouchi et al.

(10) Patent No.: US 9,166,513 B2
(45) Date of Patent: Oct. 20, 2015

(54) INVERTER APPARATUS, METHOD OF CONTROLLING INVERTER APPARATUS, AND ELECTRIC MOTOR DRIVE SYSTEM

(71) Applicant: KABUSHIKI KAISHA YASKAWA DENKI, Kitakyushu-shi (JP)

(72) Inventors: Masashi Takenouchi, Kitakyushu (JP); Tomohiro Kawachi, Kitakyushu (JP); Kenji Tomohara, Kitakyushu (HK); Koji Higashikawa, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 369 days.

(21) Appl. No.: 13/895,360

(22) Filed: May 16, 2013

(65) Prior Publication Data
US 2014/0210397 A1      Jul. 31, 2014

(30) Foreign Application Priority Data
Jan. 31, 2013    (JP) ................................. 2013-017874

(51) Int. Cl.
*H02P 25/18*    (2006.01)
*H02P 6/08*     (2006.01)

(52) U.S. Cl.
CPC . *H02P 25/18* (2013.01); *H02P 6/08* (2013.01)

(58) Field of Classification Search
CPC ................................. H02P 21/00; H02P 25/18
USPC .............. 318/95, 400.41, 494–499, 538, 704, 318/773, 268
See application file for complete search history.

(56) References Cited

U.S. PATENT DOCUMENTS 3,624,471 A  * 11/1971  Japp et al. ...................... 318/771
5,068,559 A  * 11/1991  Satake et al. ................... 310/112
8,288,979 B2 * 10/2012  Bates et al. .................... 318/432

FOREIGN PATENT DOCUMENTS

JP       05-003694      1/1993
JP       2002-291288    10/2002

OTHER PUBLICATIONS

Japanese Office Action for corresponding JP Application No. 2013-017874, Mar. 18, 2014.

* cited by examiner

*Primary Examiner* — Bentsu Ro
(74) *Attorney, Agent, or Firm* — Mori & Ward, LLP

(57) ABSTRACT

Provided is an inverter apparatus 20 configured to switch a current winding to an optimal winding when a rotation speed of a rotor of an AC electric motor 40 is within a hysteresis region defined by first and second switch timings for switching a state of an armature winding between a first winding and a second winding and when the current winding differs from the optimal winding.

19 Claims, 13 Drawing Sheets

FIG.5A

| CURRENT WINDING | ROTATION SPEED($\omega$) | TORQUE(T) | POWER SUPPLY VOLTAGE(V) | OPTIMAL WINDING |
|---|---|---|---|---|
| HIGH SPEED WINDING | $\omega 1$ | T1 | V1 | LOW SPEED WINDING |
| LOW SPEED WINDING | $\omega 2$ | T2 | V2 | LOW SPEED WINDING |
| HIGH SPEED WINDING | $\omega 3$ | T3 | V3 | HIGH SPEED WINDING |
| LOW SPEED WINDING | $\omega 4$ | T4 | V4 | HIGH SPEED WINDING |
| ... | ... | ... | ... | ... |

FIG.5B

| CASE | CURRENT WINDING | ROTATION SPEED($\omega$) | TORQUE (T) | POWER SUPPLY VOLTAGE(V) | OPTIMAL WINDING |
|---|---|---|---|---|---|
| 1 | HIGH SPEED WINDING | $\omega 1$ | T1 | Va | HIGH SPEED WINDING |
| 2 | LOW SPEED WINDING | $\omega 2$ | T2 | Va | HIGH SPEED WINDING |
| 3 | HIGH SPEED WINDING | $\omega 3$ | T3 | Va | LOW SPEED WINDING |
| 4 | LOW SPEED WINDING | $\omega 4$ | T4 | Va | LOW SPEED WINDING |

| CASE | CURRENT WINDING | ROTATION SPEED($\omega$) | POWER SUPPLY VOLTAGE(V) | OPTIMAL WINDING |
|---|---|---|---|---|
| 5 | HIGH SPEED WINDING | $\omega 1$ | Vb | HIGH SPEED WINDING |
| 6 | LOW SPEED WINDING | $\omega 2$ | Vb | HIGH SPEED WINDING |
| 7 | HIGH SPEED WINDING | $\omega 3$ | Vb | LOW SPEED WINDING |
| 8 | LOW SPEED WINDING | $\omega 4$ | Vb | LOW SPEED WINDING |

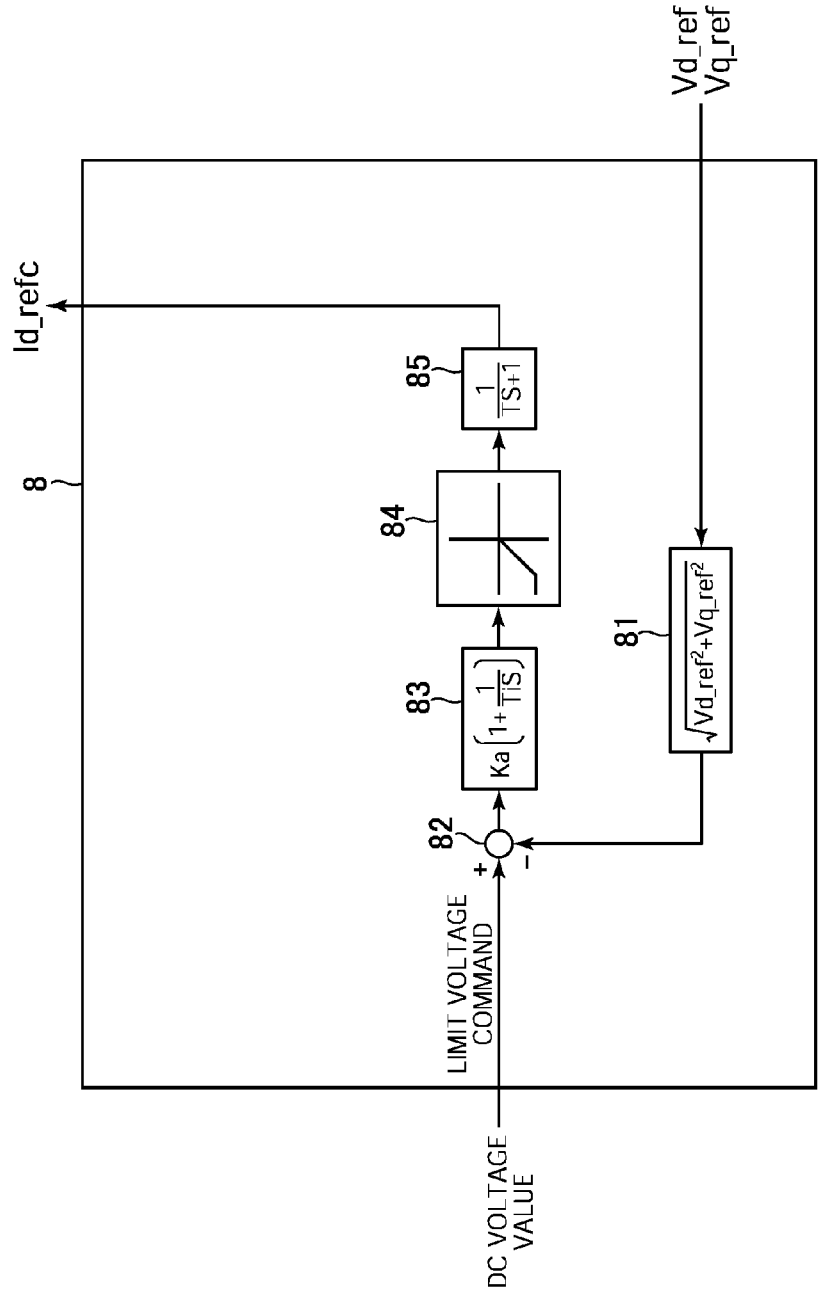

INVERTER APPARATUS, METHOD OF CONTROLLING INVERTER APPARATUS, AND ELECTRIC MOTOR DRIVE SYSTEM

INCORPORATION BY REFERENCE

The present disclosure contains subject matter related to that disclosed in Japanese Priority Patent Application JP2013-017874 filed in the Japan Patent Office on Jan. 31, 2013, the entire contents of which are hereby incorporated by reference.

BACKGROUND OF THE INVENTION

1. Field of the Invention

The embodiments disclosed herein relate to an inverter apparatus, a method of controlling the inverter apparatus, and an electric motor drive system.

2. Description of the Related Art

Hitherto, there is known a winding switching method enabling operation in a wide range from a low speed area to a high speed area by switching armature windings of an AC electric motor.

Japanese Patent Application Laid-open No. Hei 5-3694 discloses a variable speed driving method involving switching winding connection of a synchronous electric motor by an inverter apparatus used for vehicle driving or the like, in which stable driving is achieved by setting a hysteresis region in switch timing of the winding connection. Specifically, in the above-mentioned variable speed driving method, switch timing from a star connection to a delta connection is set to a speed level Vo (base speed N1), while switch timing from the delta connection to the star connection is set to a speed level Vo' lower than Vo, and thus the hysteresis region is set in the switch timing.

SUMMARY OF THE INVENTION

According to an exemplary embodiment, there is provided an inverter apparatus, the inverter apparatus including a winding switching signal generator configured to output a winding switching signal having hysteresis characteristics for switch timings of a first winding and a second winding, which are determined based on a rotation speed of a rotor of the AC electric motor, to a winding switch configured to switch connection of the armature winding so that a state of the armature winding is interchangeably switched between the first winding and the second winding, in which the winding switching signal generator includes: a hysteresis region judging section configured to judge whether or not the rotation speed is within a hysteresis region defined by a first switch timing and a second switch timing; a winding comparator configured to judge, when the rotation speed is within the hysteresis region, whether or not a current winding is the same as an optimal winding that is set in advance; and a winding switching signal output section configured to output, when the rotation speed is within the hysteresis region and when the current winding differs from the optimal winding, the winding switching signal so that the current winding is switched to the optimal winding, and the inverter apparatus is connected to the armature winding of the AC electric motor, and is configured to control the AC electric motor.

According to an exemplary embodiment, there is provided a method of controlling an inverter apparatus, the method including: judging whether or not a rotation speed of a rotor of the AC electric motor is within a hysteresis region defined by a first switch timing and a second switch timing for switching a state of an armature winding of the AC electric motor between a first winding and a second winding; judging, when the rotation speed is within the hysteresis region, whether or not a current winding is the same as an optimal winding that is set in advance; and outputting a winding switching signal to a winding switch configured to switch the state of the armature winding between the first winding and the second winding so that the current winding is switched to the optimal winding when the rotation speed is within the hysteresis region and when the current winding differs from the optimal winding, and wherein the inverter apparatus controls the AC electric motor.

According to an exemplary embodiment, there is provided an electric motor drive system, including: an AC electric motor; an inverter apparatus to be connected to an armature winding of the AC electric motor configured to control the AC electric motor; and a winding switch configured to switch connection of the armature winding, in which: the inverter apparatus includes a winding switching signal generator configured to output a winding switching signal having hysteresis characteristics for switch timings of a first winding and a second winding, which are determined based on a rotation speed of a rotor of the AC electric motor, to the winding switch configured to switch the connection of the armature winding so that a state of the armature winding is switched between the first winding and the second winding; the winding switching signal generator includes: a hysteresis region judging section configured to judge whether or not the rotation speed is within a hysteresis region defined by a first switch timing and a second switch timing; a winding comparator configured to judge, when the rotation speed is within the hysteresis region, whether or not a current winding is the same as an optimal winding that is set in advance; and a winding switching signal output section configured to output, when the rotation speed is within the hysteresis region and when the current winding differs from the optimal winding, the winding switching signal so that the current winding is switched to the optimal winding; and the winding switch is configured to switch the state of the armature winding of the AC electric motor to one of the first winding and the second winding based on the winding switching signal.

BRIEF DESCRIPTION OF THE DRAWINGS

FIG. 5A is a diagram illustrating an example of a table.

FIG. 5B is a diagram illustrating an example of the table.

FIG. 12 is a block diagram illustrating a structure of a constant output controller.

DESCRIPTION OF THE EMBODIMENTS

An embodiment is described below with reference to the attached drawings.

Figure 1:
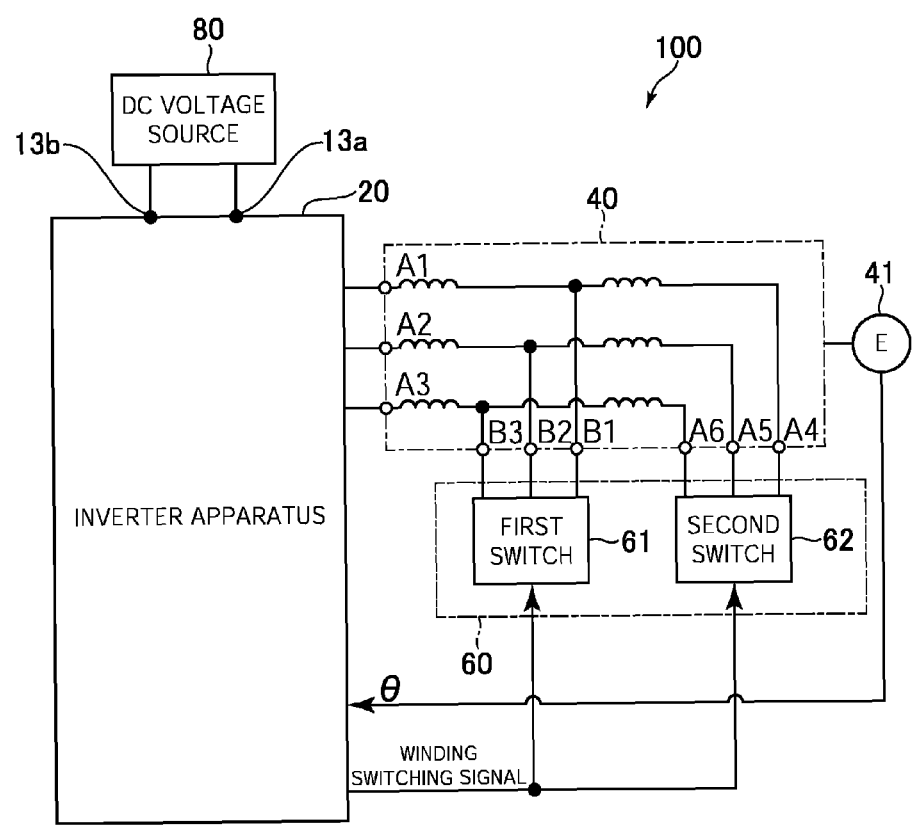
FIG. 1 is a block diagram illustrating a schematic structure of an electric motor drive system.

FIG. 1 is a block diagram illustrating a schematic structure of an electric motor drive system 100.

As illustrated in FIG. 1, the electric motor drive system 100 includes an inverter apparatus 20, an AC electric motor 40, a position detector 41, a winding switch 60, and a DC voltage source 80.

The inverter apparatus 20 is a power conversion apparatus for converting DC power supplied from the DC voltage source 80 into three-phase AC power. The inverter apparatus 20 is connected to connection terminals A1 to A3 respectively disposed at one ends of armature windings (hereinafter sometimes referred to simply as "windings") of phases of the AC electric motor 40. Note that, a structure of the inverter apparatus 20 is described later with reference to FIG. 2.

The AC electric motor 40 is a three-phase AC electric motor including three-phase armature windings of U-phase, V-phase, and W-phase. The AC electric motor 40 is driven by a voltage output from the inverter apparatus 20. The AC electric motor 40 is connected to the winding switch 60 via connection terminals A4 to A6 disposed to end terminals of the phase armature windings and connection terminals B1 to B3 disposed to midpoints (intermediate points in this case) thereof. Note that, a synchronous electric motor is described as an example of the AC electric motor 40 in this embodiment, but the AC electric motor 40 may be another electric motor such as an induction electric motor without being limited to the synchronous electric motor.

The position detector 41 is a detector connected to the AC electric motor 40 so as to detect a rotor phase θ of the AC electric motor 40. As the position detector 41, an encoder, a resolver, or the like can be used, for example.

The DC voltage source 80 includes an AC power supply and a rectifier circuit, and supplies DC power to the inverter apparatus 20. As the DC voltage source 80, it is possible to use a DC power supply such as a battery without the rectifier circuit.

The winding switch 60 is a switch for switching armature winding connection of the respective phases.

Next, a specific structure of the winding switch 60 is described with reference to FIG. 3.

(Structural Example of Winding Switch 60)

Figure 3:
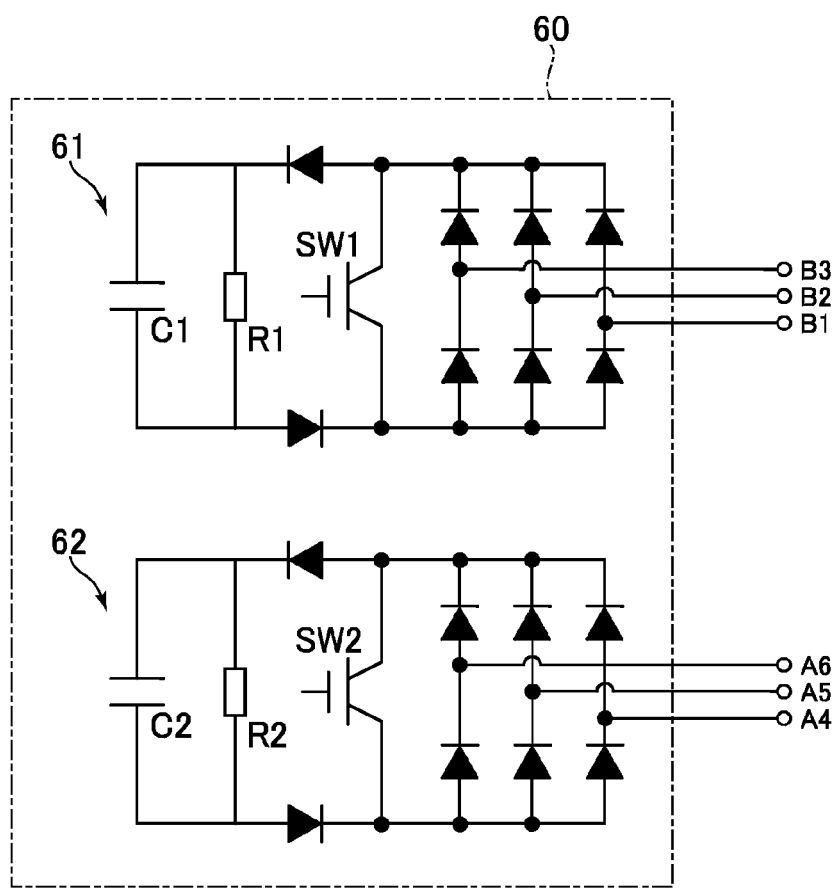
FIG. 3 is a circuit diagram illustrating a schematic structure of a winding switch.

FIG. 3 is a circuit diagram illustrating a schematic structure of the winding switch 60. The winding switch 60 includes a first switch 61 connected to the connection terminals B1 to B3 of the AC electric motor 40, and a second switch 62 connected to the connection terminals A4 to A6. Using the first switch 61 and the second switch 62, the winding switch 60 short-circuits the end terminals or the intermediate points of the armature windings of the AC electric motor 40 so as to switch the winding connection of the AC electric motor 40.

The winding switch 60 has basically the same structure as the winding switch illustrated in FIG. 1 of Japanese Patent No. 3948009. The winding switch 60 includes capacitors (C1 and C2) and resistors (R1 and R2) disposed separately for the first switch 61 and the second switch 62, respectively, so as to effectively absorb a surge voltage generated by energy discharged by winding switching.

The winding switch 60 receives a winding switching signal described later from the inverter apparatus 20 so that SW1 of the first switch 61 is turned off while SW2 of the second switch 62 is turned on. Then, the end terminals of the armature windings (connection terminals A4 to A6) are short-circuited so that winding impedance becomes largest. This state is hereinafter referred to as "low speed mode". On the contrary, when the winding switch 60 receives the winding switching signal so that the SW1 of the first switch 61 is turned on while the SW2 of the second switch 62 is turned off, the intermediate points of the armature windings (connection terminals B1 to B3) are short-circuited so that the winding impedance decreases. This state is hereinafter referred to as "high speed mode". The winding state corresponding to the low speed mode is hereinafter referred to as "low speed winding", while the winding state corresponding to the high speed mode is hereinafter referred to as "high speed winding".

In this way, the winding switch 60 receives the winding switching signal from the inverter apparatus 20 so as to switch between the low speed winding and the high speed winding. Thus, the electric motor drive system 100 switches electric motor constants in accordance with the speed so as to enable efficient operation over the entire speed region. In addition, in the electric motor drive system 100, in order to enhance operation stability of the AC electric motor 40, the winding switch characteristics have hysteresis characteristics. A specific structure for the switching of winding having the hysteresis characteristics is described later.

(Structure of Inverter Apparatus 20)

Figure 2:
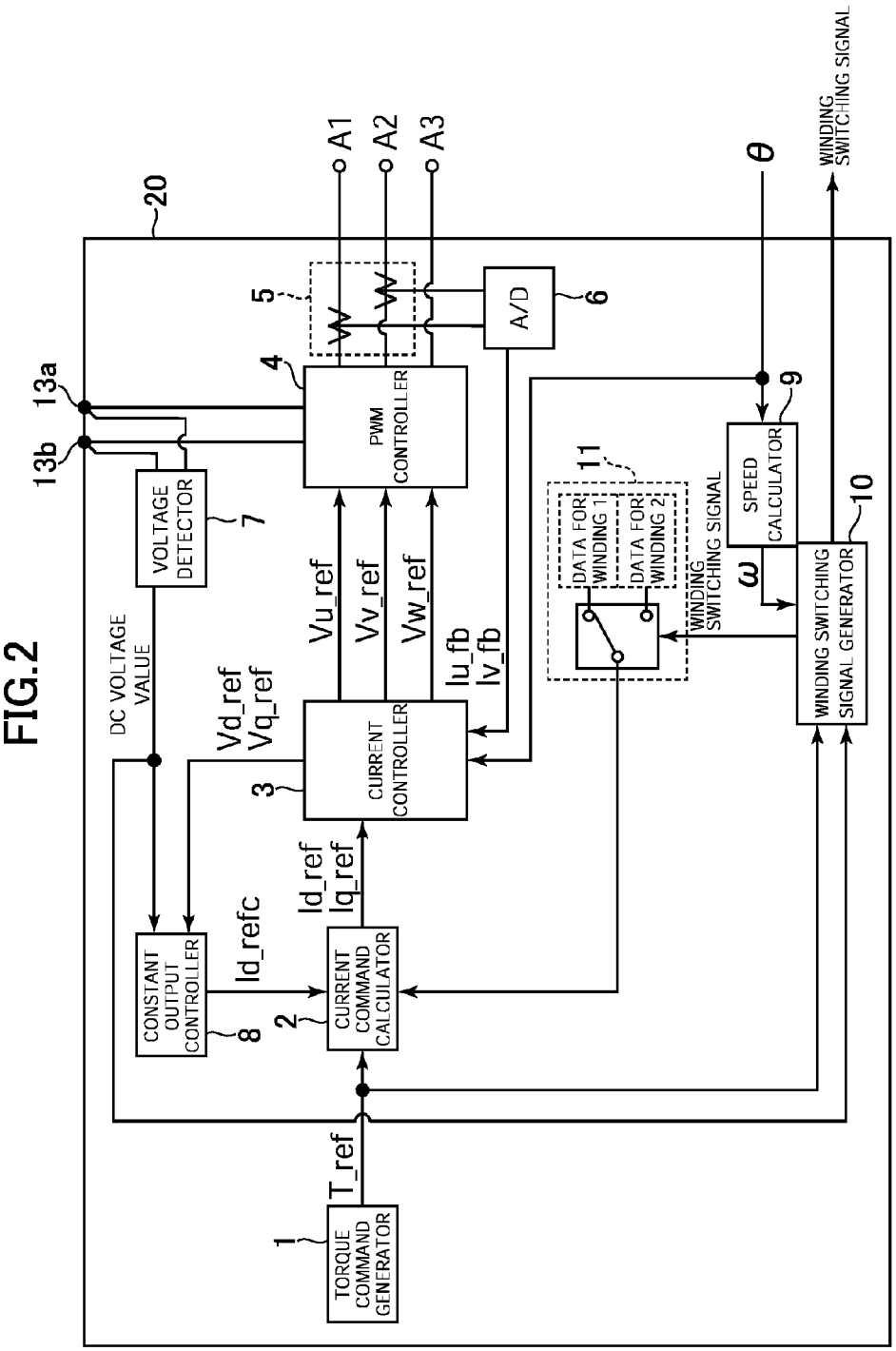
FIG. 2 is a block diagram illustrating a schematic structure of an inverter apparatus.

A structure of the inverter apparatus 20 is described with reference to FIG. 2. As illustrated in FIG. 2, the inverter apparatus 20 includes a torque command generator 1, a current command calculator 2, a current controller 3, a pulse width modulation (PWM) controller 4, a current detector 5, and an A/D converter 6. Further, the inverter apparatus 20 includes a voltage detector 7, a constant output controller 8, a speed calculator 9, a winding switching signal generator 10, a constant switch 11, and input terminals 13a and 13b.

The torque command generator 1 is a processor for generating a torque command T_ref as a target value of a torque amount output from the AC electric motor 40, and outputting the torque command T_ref to the current command calculator 2 and the winding switching signal generator 10.

The current command calculator 2 is a processor for generating a d-axis current command Id_ref and a q-axis current command Iq_ref on the basis of the torque command T_ref output from the torque command generator 1, the electric motor constants and control parameters output from the constant switch 11, and a constant output amount Id_refc output from the constant output controller 8. The current command calculator 2 outputs the generated d-axis current command Id_ref and q-axis current command Iq_ref to the current controller 3. A specific structure of the current command calculator 2 is described later with reference to FIG. 14.

The current controller 3 is a processor for controlling the current corresponding to the d-axis current command Id_ref and the q-axis current command Iq_ref output from the current command calculator 2 to flow to the AC electric motor 40 so as to generate voltage commands Vd_ref and Vq_ref. In addition, the current controller 3 also performs processing of converting the generated voltage commands Vd_ref and Vq_ref into voltage commands Vu_ref, Vv_ref, and Vw_ref of the respective phases (U-phase, V-phase, and W-phase). Then, the current controller 3 outputs the voltage commands Vd_ref and Vq_ref to the constant output controller 8 and outputs the voltage commands Vu_ref, Vv_ref, and Vw_ref to the PWM controller 4. A specific structure of the current controller 3 is described later with reference to FIG. 13.

The PWM controller 4 is a processor for performing pulse width modulation control (PWM control) in accordance with a carrier wave signal (not shown) and the voltage commands Vu_ref, Vv_ref, and Vw_ref of the respective phases (U-phase, V-phase, and W-phase) output from the current controller 3, so as to supply a variable voltage having a variable frequency to the AC electric motor 40. The PWM controller 4 includes a switching element section (not shown). The switching element section performs power conversion of the DC power supplied from the DC voltage source 80 and supplies the converted power to the AC electric motor 40.

The current detector 5 is a detector for detecting the current flowing through a winding of the AC electric motor 40. The current detected by the current detector 5 is output to the A/D converter 6.

The A/D converter 6 is a converter for converting the current detected by the current detector 5 into a digital signal. Detected values Iu_fb and Iv_fb of the currents converted into digital signals by the A/D converter 6 are output to the current controller 3.

The voltage detector 7 is a detector for detecting a potential (power supply voltage V) of the DC voltage source 80, specifically, a potential between the input terminals 13a and 13b of the inverter apparatus 20 connected to the DC voltage source 80. The voltage detector 7 outputs the detected value as a DC voltage value to the constant output controller 8 and the winding switching signal generator 10.

The constant output controller 8 is a processor for calculating the constant output amount Id_refc on the basis of the voltage commands Vd_ref and Vq_ref output from the current controller 3 and the highest voltage that can be output based on the DC voltage value output from the voltage detector 7 when the voltage commands reach the highest voltage. The constant output amount Id_refc is used for field weakening control. A specific structure of the constant output controller 8 is described later with reference to FIG. 12.

The speed calculator 9 is a calculator for calculating a rotation speed ω of the rotor of the AC electric motor 40 on the basis of the rotor phase θ output from the position detector 41. The calculated rotation speed ω is output to the winding switching signal generator 10.

The winding switching signal generator 10 is a processor for performing the switching between the low speed winding and the high speed winding by outputting the winding switching signal to the winding switch 60. Specifically, the winding switching signal generator 10 determines an optimal winding on the basis of the rotation speed ω output from the speed calculator 9, the torque command T_ref output from the torque command generator 1, the DC voltage value output from the voltage detector 7, and the like, and outputs the winding switching signal for switching to the determined winding to the winding switch 60 and the constant switch 11. A specific structure of the winding switching signal generator 10 is described later.

The constant switch 11 holds the electric motor constants and control parameter data for the low speed mode (winding 1) and for the high speed mode (winding 2), outputs data chosen in accordance with the winding switching signal output from the winding switching signal generator 10 to the current command calculator 2, and switches to the electric motor constants and control parameters matching with a winding state of the AC electric motor 40. Note that, as the electric motor constants and control parameters held by the constant switch 11, there are, for example, a torque-current conversion factor (K), a current phase (β), armature winding inductance values (Ld and Lq), an armature flux linkage (Φ), and an armature winding resistance (R). The constant switch 11 may hold any one of the electric motor constants and control parameter data.

With the above-mentioned structure, the inverter apparatus 20 drives the AC electric motor 40 on the basis of the torque command T_ref.

In the following, specific structures of the winding switching signal generator 10, the constant output controller 8, the current controller 3, and the current command calculator 2 are described with reference to FIGS. 4, 12, 13, and 14.

(Structure of Winding Switching Signal Generator 10)

Figure 4:
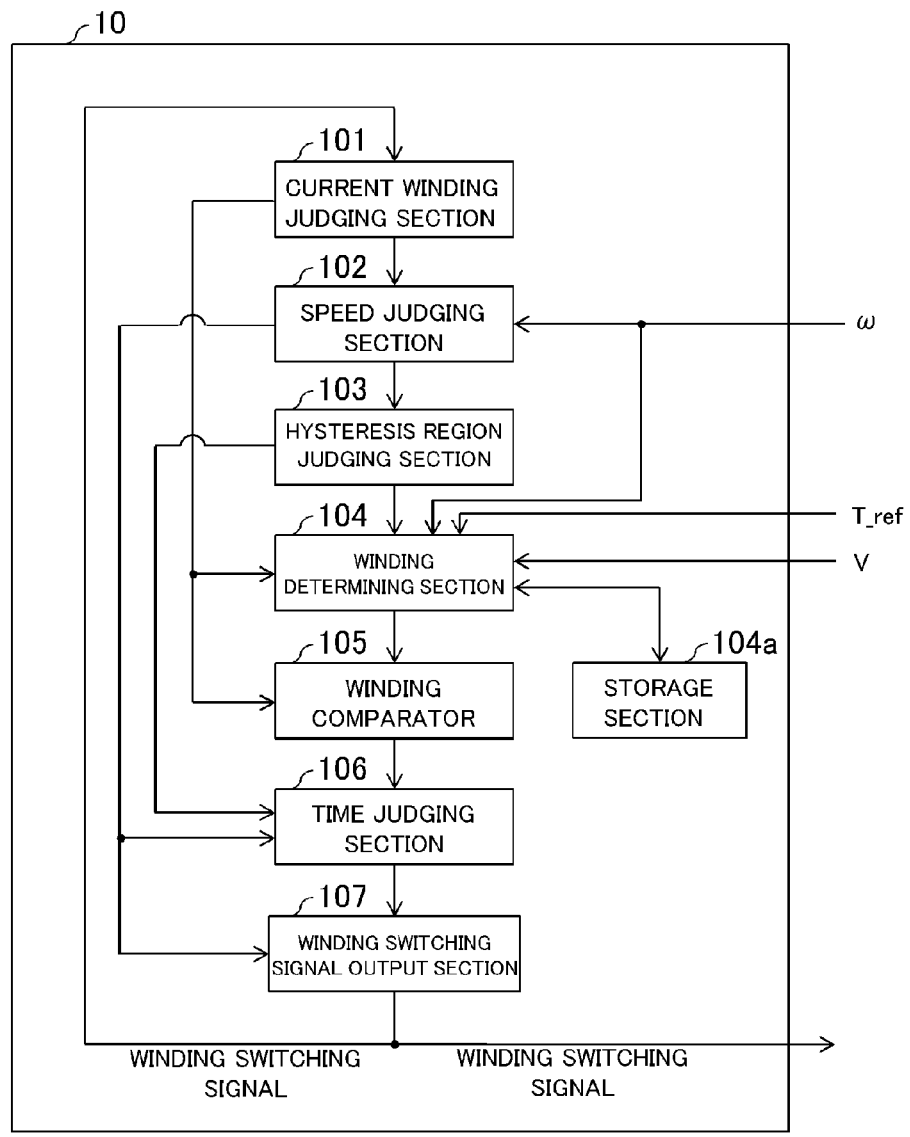
FIG. 4 is a block diagram illustrating a structure of a winding switching signal generator.

A specific structure of the winding switching signal generator 10 is described with reference to FIG. 4. FIG. 4 is a block diagram illustrating the structure of the winding switching signal generator 10. As illustrated in FIG. 4, the winding switching signal generator 10 includes a current winding judging section 101, a speed judging section 102, a hysteresis region judging section 103, a winding determining section 104, a winding comparator 105, a time judging section 106, and a winding switching signal output section 107.

The current winding judging section 101 judges whether the current winding state (current winding) is the low speed winding or the high speed winding. For instance, the current winding judging section 101 judges whether the current winding is the low speed winding or the high speed winding on the basis of the winding switching signal. The current winding judging section 101 outputs the judging result to the speed judging section 102, the winding determining section 104, and the winding comparator 105.

The speed judging section 102 judges, on the basis of the judging result of the current winding judging section 101, whether or not the rotation speed ω of the rotor of the AC electric motor 40 is lower than a first reference rotation speed ωa, and whether or not the rotation speed ω is higher than a second reference rotation speed ωb. Specifically, when the current winding is the low speed winding, the speed judging section 102 judges whether or not the rotation speed ω is higher than the second reference rotation speed ωb. When the current winding is the high speed winding, the speed judging section 102 judges whether or not the rotation speed ω is lower than the first reference rotation speed ωa. The speed judging section 102 outputs the judging result to the hysteresis region judging section 103, the time judging section 106, and the winding switching signal output section 107.

In this case, the first reference rotation speed ωa is a speed to be a reference (winding switch timing) for switching from the high speed winding to the low speed winding. The second reference rotation speed ωb is a speed to be a reference (winding switch timing) for switching from the low speed winding to the high speed winding. The first reference rotation speed ωa and the second reference rotation speed ωb are values set in advance in accordance with characteristics of the AC electric motor 40, and satisfy the relationship of ωa<ωb. Accordingly, the range from the first reference rotation speed ωa to the second reference rotation speed ωb is the hysteresis region.

The hysteresis region judging section 103 judges whether or not the rotation speed ω is within the range (hysteresis region) from the first reference rotation speed ωa to the second reference rotation speed ωb. The hysteresis region judging section 103 outputs the judging result to the winding determining section 104 and the time judging section 106.

The winding determining section 104 receives the judging result of the current winding judging section 101 and the judging result of the hysteresis region judging section 103 (indicating that the rotation speed ω is within the hysteresis region), and then determines the optimal winding. In other words, the winding determining section 104 determines one of the low speed winding and the high speed winding in which energy efficiency of the AC electric motor 40 becomes optimal. Specifically, for example, the winding determining section 104 refers to a table stored in a storage section 104*a* so as to determine the optimal winding. The winding determining section 104 outputs information of the determined optimal winding to the winding comparator 105.

The optimal winding is determined by referring to the table in which the current winding is associated with, for example, any one element of the rotation speed ω, the torque T, and the power supply voltage V, or another element (for example, temperature). FIGS. 5A and 5B each show an example of the table stored in the storage section 104*a* for determining the optimal winding. The table shown in FIG. 5A is a table for determining the optimal winding on the basis of the current winding, the rotation speed ω, the torque T, and the power supply voltage V. In the table shown in FIG. 5B, the power supply voltage V is constant (Va). The table of FIG. 5B is used in a case where a variation of the power supply voltage V can be neglected, or in a case where the power supply voltage V is controlled to be constant. The tables of FIGS. 5A and 5B are generated on the basis of a map for determining the optimal winding shown in FIG. 6.

Figure 6:
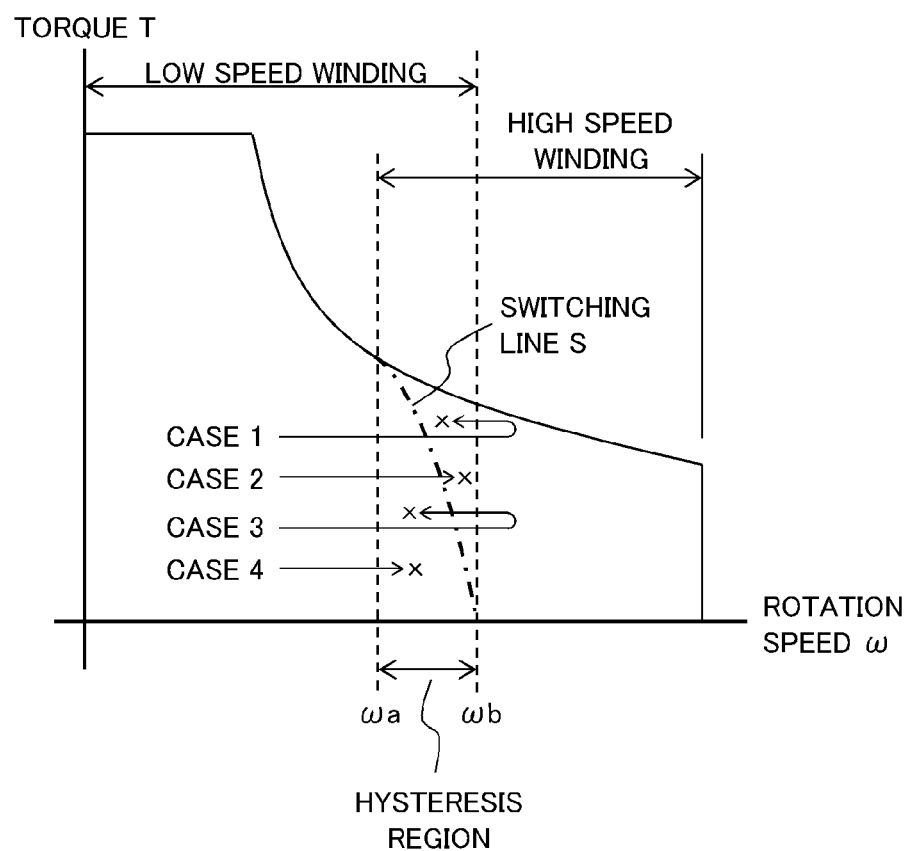
FIG. 6 is a graph for describing a method of determining an optimal winding.

FIG. 6 is a graph (an example of the map) showing a method of determining the optimal winding. It is preferred to prepare a plurality of types of the maps for each value of the power supply voltage V. In accordance with the power supply voltage V, the rotation speed ω at which the field weakening control starts is changed, and hence a phase of the current flowing in the AC electric motor 40 is changed (magnitudes of the d-axis current Id and the q-axis current Iq are changed). Thus, energy efficiency of the AC electric motor 40 is changed, and therefore it is preferred to prepare the map for each value of the power supply voltage V in order to support the above-mentioned change. Note that, FIG. 6 shows a case in which the power supply voltage V is Va, for example.

In each of the prepared maps, a switching line S (FIG. 6) in the hysteresis region is set so that energy efficiency of the AC electric motor 40 is optimized. Within the hysteresis region shown in FIG. 6, the region on the right side of the switching line S (high speed area in which the rotation speed ω is high) indicates a region where the high speed winding has higher energy efficiency of the AC electric motor 40 than the low speed winding, and the region on the left side of the switching line S (low speed area in which the rotation speed ω is low) indicates a region where the low speed winding has higher energy efficiency of the AC electric motor 40 than the high speed winding.

Next, with reference to FIGS. 5B and 6, a method for judging the optimal winding is described with examples of a drive pattern of the AC electric motor 40. FIG. 6 shows Cases 1 to 4 as examples of the drive pattern of the AC electric motor 40, which respectively correspond to Cases 1 to 4 in the table of FIG. 5B. Note that, FIGS. 5B and 6 show the structure for determining the optimal winding on the basis of the rotation speed ω and the torque T of the rotor of the AC electric motor 40.

In Case 1, the rotation speed ω exceeds the second reference rotation speed ωb and switches from the low speed winding to the high speed winding (current winding). After that, the rotation speed ω changes to the low speed side to enter the hysteresis region, and remains in the high speed area within the hysteresis region. In this case, because the high speed winding has higher energy efficiency of the AC electric motor 40 than the low speed winding, the high speed winding is determined to be the optimal winding.

In Case 2, the current winding is the low speed winding, and the rotation speed ω exceeds the switching line S in the hysteresis region so as to remain in the high speed area. In this case, because the high speedwinding has higher energy efficiency of the AC electric motor 40 than the low speed winding, the high speed winding is determined to be the optimal winding.

In Case 3, the rotation speed ω exceeds the second reference rotation speed ωb and switches from the low speed winding to the high speedwinding (current winding). After that, the rotation speed ω changes to the low speed side to enter the hysteresis region, and further exceeds the switching line S so as to remain in the low speed area within the hysteresis region. In this case, because the low speed winding has higher energy efficiency of the AC electric motor 40 than the high speed winding, the low speed winding is determined to be the optimal winding.

In Case 4, the current winding is the low speed winding, and the rotation speed ω remains in the low speed area within the hysteresis region. In this case, because the low speed winding has higher energy efficiency of the AC electric motor 40 than the high speed winding, the low speed winding is determined to be the optimal winding.

The winding comparator 105 compares the current winding judged by the current winding judging section 101 with the optimal winding determined by the winding determining section 104 so as to judge whether or not the windings are different from each other. The winding comparator 105 outputs the comparison result to the time judging section 106.

When the time judging section 106 receives the judging result from the winding comparator 105 indicating that the current winding and the optimal winding are different from each other, the time judging section 106 performs time measurement, and judges whether or not the state where the current rotation speed ω is within the hysteresis region and the current winding differs from the optimal winding has continued for a preset predetermined time. Specifically, the time judging section 106 measures time until at least one of the following conditions (a) to (d) is satisfied: (a) a case where the predetermined time has elapsed; (b) a case where, when the current winding is the low speed winding, the judging result indicating that the rotation speed ω is higher than the second reference rotation speed ωb is received from the speed judging section 102, or a case where, when the current winding is the high speed winding, the judging result indicating that the rotation speed ω is lower than the first reference rotation speed ωa is received from the speed judging section 102; (c) a case where the judging result indicating that the current rotation speed ω is not within the hysteresis region is received from the hysteresis region judging section 103; and (d) a case where the judging result indicating that the current winding is the same as the optimal winding is received from the winding comparator 105. Then, when a measured time value is equal to the predetermined time (when measured time value=predetermined time), it is judged that the predetermined time has elapsed. When the measured time value is less than the predetermined time (when measured time value<predetermined time), it is judged that the predetermined time has not elapsed. The time judging section 106 outputs the judging result to the winding switching signal output section 107.

The winding switching signal output section 107 determines the winding switch timing on the basis of the judging result of the speed judging section 102 and the judging result of the time judging section 106, and outputs the winding switching signal to the winding switch 60, the constant switch 11, and the current winding judging section 101. The winding switching signal is a signal for turning off the SW1 of the first switch 61 while turning on the SW2 of the second switch 62 (low speed mode) in order to switch from the high speed winding to the low speed winding, and is a signal for turning on the SW1 of the first switch 61 while turning off the SW2 of the second switch 62 (high speed mode) in order to switch from the low speed winding to the high speed winding.

For instance, on the basis of the judging result of the speed judging section 102, the winding switching signal output section 107 determines a time point at which the rotation speed ω exceeds the second reference rotation speed ωb to be the winding switch timing when the current winding is the low speed winding, and determines a time point at which the rotation speed ω falls below the first reference rotation speed ωa to be the winding switch timing when the current winding is the high speed winding. Note that, the winding switching signal output section 107 does not regard a case where the rotation speed ω exceeds the first reference rotation speed ωa when the current winding is the low speed winding as the winding switch timing, and does not regard a case where the rotation speed ω falls below the second reference rotation speed ωb when the current winding is the high speed winding as the winding switch timing.

In addition, on the basis of the judging result of the time judging section 106, the winding switching signal output section 107 determines the time point at which the predetermined time has elapsed to be the winding switch timing.

(Operation of Winding Switching Signal Generator 10)

An example of an operation of the winding switching signal generator 10 is described with reference to a flowchart of FIG. 7.

First, in Step (hereinafter abbreviated as "S") 11, the current winding judging section 101 judges whether or not the current winding is the low speed winding. When the current winding is the low speed winding (YES in S11), the process proceeds to S12. When the current winding is the high speed winding (NO in S11), the process proceeds to S22. In the following, for convenience of description, a case where the current winding is the low speed winding and a case where the current winding is the high speed winding are separately described. The operation in the case where the current winding is the low speed winding corresponds to Cases 2 and 4 of FIG. 6, and the operation in the case where the current winding is the high speed winding corresponds to Cases 1 and 3 of FIG. 6.

(Case of Low Speed Winding)

In the case where the current winding is the low speed winding (YES in S11), the speed judging section 102 judges whether or not the rotation speed ω is higher than the second reference rotation speed ωb (S12). When the rotation speed ω is not higher than the second reference rotation speed ωb (NO in S12), the hysteresis region judging section 103 judges whether or not the rotation speed ω is within the hysteresis region (S13).

When the rotation speed ω is within the hysteresis region (YES in S13), the winding determining section 104 determines the optimal winding by referring to the table in the storage section 104a (for example, FIG. 5A) (S14). On the contrary, when the rotation speed ω is not within the hysteresis region (NO in S13), the process returns to S12.

When the optimal winding is determined in S14, the winding comparator 105 compares the current winding (low speed winding) with the optimal winding, and judges whether or not the windings are different from each other (S15). When the current winding (low speed winding) differs from the optimal winding (NO in S15), the time judging section 106 performs the time measurement (S16). On the contrary, when the current winding (low speed winding) is the same as the optimal winding (YES in S15), the process returns to S12.

When the current winding (low speed winding) differs from the optimal winding, the time judging section 106 performs the time measurement (S16), and judges whether or not the state where the current rotation speed ω is within the hysteresis region and the current winding differs from the optimal winding has continued for a predetermined time (S17). Note that, in S16, the time judging section 106 measures time until at least one of the following conditions (a) to (d) is satisfied: (a) a case where the predetermined time has elapsed (YES in S17); (b) a case where the rotation speed ω exceeds the second reference rotation speed ωb (YES in S12); (c) a case where the current rotation speed ω is outside the hysteresis region (NO in S13); and (d) a case where the current winding becomes the same as the optimal winding (YES in S15).

When the predetermined time has elapsed (when measured time value=predetermined time) (YES in S17), namely, when the state where the current rotation speed ω is within the hysteresis region and the current winding differs from the optimal winding has continued for the predetermined time, the time judging section 106 resets the measured time value (S18). After that, the winding switching signal output section 107 determines the time point at which the predetermined time has elapsed to be the winding switch timing, and outputs the winding switching signal for switching to the high speed winding to the winding switch 60, the constant switch 11, and the current winding judging section 101 (S20). On the contrary, when the predetermined time has not elapsed (when measured time value<predetermined time) (NO in S17), namely, when at least one of the conditions, which are the case where the rotation speed ω exceeds the second reference rotation speed ωb, the case where the current rotation speed ω is outside the hysteresis region, and the case where the current winding becomes the same as the optimal winding, is satisfied before the predetermined time has elapsed, the time judging section 106 resets the measured time value (S19), and then the process returns to S12.

Note that, in S12, when the rotation speed ω is higher than the second reference rotation speed ωb (YES in S12), the process proceeds to S20. Then, the winding switching signal output section 107 determines the time point at which the rotation speed ω exceeds the second reference rotation speed ωb to be the winding switch timing, and outputs the winding switching signal for switching to the high speed winding to the winding switch 60, the constant switch 11, and the current winding judging section 101.

(Case of High Speed Winding)

When the current winding is the high speed winding (NO in S11), the speed judging section 102 judges whether or not the rotation speed ω is lower than the first reference rotation speed ωa (S22). When the rotation speed ω is not lower than the first reference rotation speed ωa (NO in S22), the hysteresis region judging section 103 judges whether or not the rotation speed ω is within the hysteresis region (S23).

When the rotation speed ω is within the hysteresis region (YES in S23), the winding determining section 104 refers to the table in the storage section 104a (for example, FIG. 5A) and determines the optimal winding (S24). On the contrary, when the rotation speed ω is not within the hysteresis region (NO in S23), the process returns to S22.

When the optimal winding is determined in S24, the winding comparator 105 compares the current winding (high speed winding) with the optimal winding so as to judge whether or not the windings are different from each other (S25). When the current winding (high speed winding) differs from the optimal winding (NO in S25), the time judging section 106 performs the time measurement (S26). On the contrary, when the current winding (high speed winding) is the same as the optimal winding (YES in S25), the process returns to S22.

When the current winding (high speed winding) differs from the optimal winding, the time judging section 106 performs the time measurement (S26), and judges whether or not the state where the current rotation speed ω is within the hysteresis region and the current winding differs from the optimal winding has continued for a predetermined time (S27). Note that, in S26 the time judging section 106 measures time until at least one of the following conditions (a) to (d) is satisfied: (a) a case where the predetermined time has elapsed (YES in S27); (b) a case where the rotation speed ω falls below the first reference rotation speed ωa (YES in S22); (c) a case where the current rotation speed ω is outside the hysteresis region (NO in S23); and (d) a case where the current winding becomes the same as the optimal winding (YES in S25).

When the predetermined time has elapsed (when measured time value=predetermined time) (YES in S27), namely, when the state where the current rotation speed ω is within the hysteresis region and the current winding differs from the optimal winding has continued for the predetermined time, the time judging section 106 resets the measured time value (S28). After that, the winding switching signal output section 107 determines the time point at which the predetermined time has elapsed to be the winding switch timing, and outputs the winding switching signal for switching to the low speed winding to the winding switch 60, the constant switch 11, and the current winding judging section 101 (S30). On the contrary, when the predetermined time has not elapsed (when measured time value<predetermined time) (NO in S27), namely, when at least one of the conditions is satisfied, which are the case where the rotation speed ω falls below the first reference rotation speed ωa, the case where the current rotation speed ω is outside the hysteresis region, and the case where the current winding becomes the same as the optimal winding, before the predetermined time has elapsed, the time judging section 106 resets the measured time value (S29), and then the process returns to S22.

Note that, when the rotation speed ω is lower than the first reference rotation speed ωa in S22 (YES in S22), the process proceeds to S30. Then, the winding switching signal output section 107 determines the time point at which the rotation speed ω falls below the first reference rotation speed ωa to be the winding switch timing, and outputs the winding switching signal for switching to the low speed winding to the winding switch 60, the constant switch 11, and the current winding judging section 101.

Figure 8:
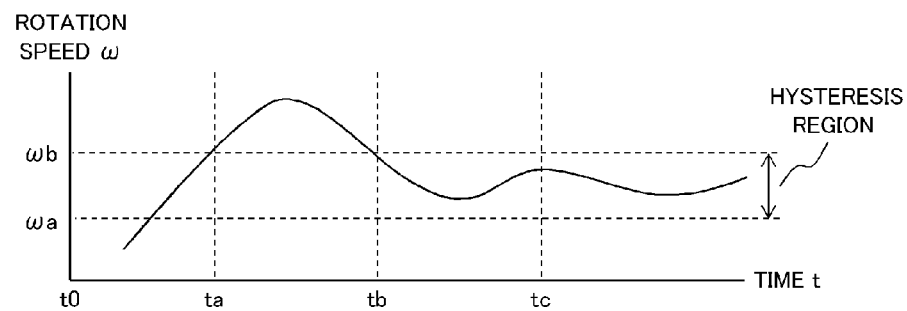
FIG. 8 is a graph showing a relationship between time and rotation speed in Case 3 of FIG. 6.

Next, an operation example of the winding switching signal generator 10 is described with reference to an example of Case 3 of FIG. 6. FIG. 8 is a graph showing a relationship between time t and the rotation speed ω in Case 3. As shown in FIG. 8, the rotation speed ω increases as time elapses after time t0, exceeds the second reference rotation speed ωb at time ta, falls below the second reference rotation speed ωb at time tb, and afterwards varies within the hysteresis region.

Figure 9:
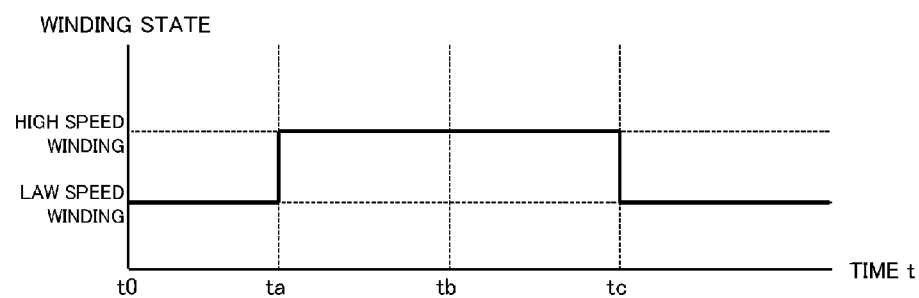
FIG. 9 is a graph showing a relationship between time and winding state.

FIG. 9 is a graph showing a relationship between the time t and the winding state. In Case 3, the rotation speed ω exceeds the second reference rotation speed ωb at the time ta (S12 in FIG. 7) (FIG. 8), and the winding switching signal for switching to high speed winding is output (S20) so that the current winding is switched to the high speed winding (FIG. 9). The rotation speed ω varies in the high speed winding from the time ta to the time tb. After the time tb, the rotation speed ω varies within the hysteresis region (S11, S22, and S23) (FIG. 8). Now, in Case 3, as shown in the table of FIG. 5B, the low speed winding is the optimal winding (S24). Because the current winding (high speed winding) differs from the optimal winding (low speed winding) (S25), time is measured within the hysteresis region of the rotation speed ω (S26). Then, when the state where the rotation speed ω is within the hysteresis region and the current winding differs from the optimal winding has continued for a predetermined time (tb to tc) (S27) (FIG. 8), the winding switching signal for switching to low speed winding is output at time tc (S30) so that the current winding is switched to the low speed winding (FIG. 9).

In Cases 1, 2, and 4 of FIG. 6, the winding switching signal is output so that the winding is switched by the same process as the one described above.

With the structure of the winding switching signal generator 10 according to this embodiment, even when the rotation speed ω of the rotor of the AC electric motor 40 is within the hysteresis region, it is possible to switch to the optimal winding. Therefore, energy efficiency of the AC electric motor 40 can be enhanced.

Modification Example 1

Figure 10:
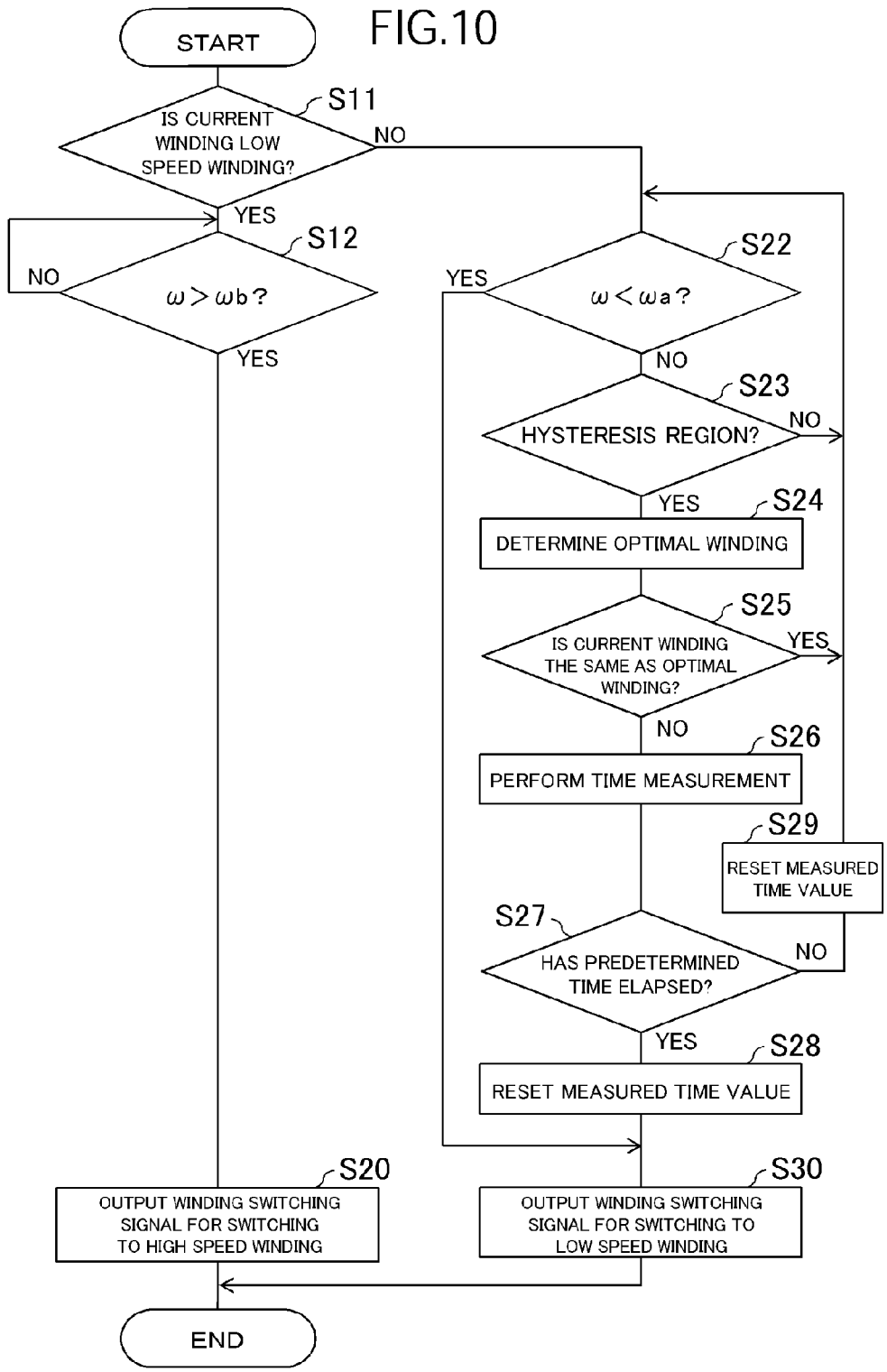
FIG. 10 is a flowchart illustrating an example of operation of the winding switching signal generator according to Modification Example 1.

FIG. 10 is a flowchart illustrating an example of an operation of the winding switching signal generator 10 according to Modification Example 1.

Figure 7:
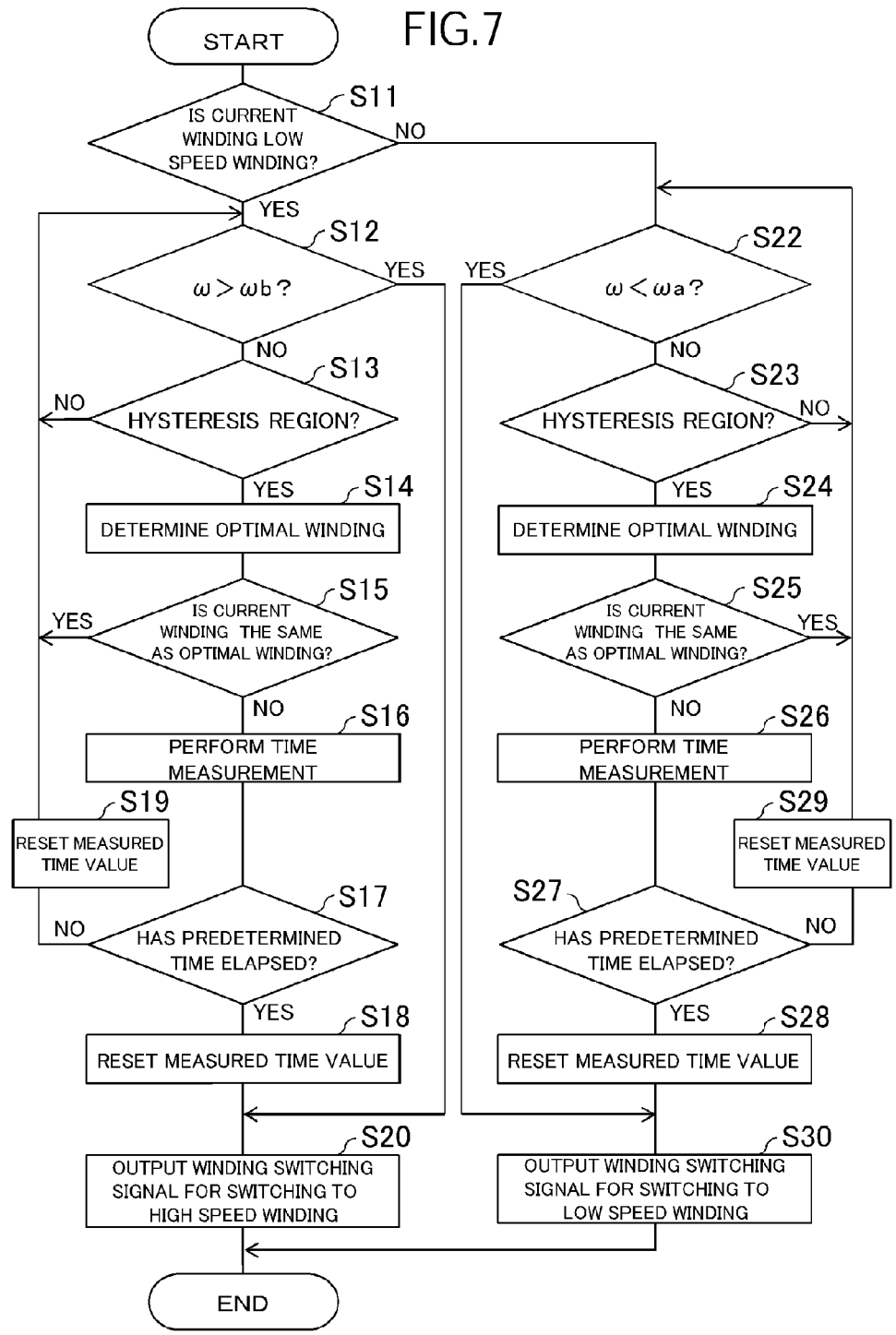
FIG. 7 is a flowchart illustrating an example of operation of the winding switching signal generator.

In the operation of the winding switching signal generator 10 illustrated in FIG. 7, when the current winding is the low speed winding and the rotation speed ω is not higher than the second reference rotation speed ωb (S12), it is judged whether or not the rotation speed ω is within the hysteresis region so that the optimal winding is determined (S13). In contrast, this process is omitted in the winding switching signal generator 10 according to Modification Example 1.

Specifically, as illustrated in FIG. 10, when the current winding is the low speed winding (YES in S11) and the rotation speed ω is not higher than the second reference rotation speed ωb (NO in S12), the process returns to S12 for the judging process. On the contrary, when the rotation speed ω is higher than the second reference rotation speed ωb (YES in S12), the process proceeds to S20. Then, the winding switching signal output section 107 determines the time point at which the rotation speed ω exceeds the second reference rotation speed ωb to be the winding switch timing, and outputs the winding switching signal for switching to high speed winding to the winding switch 60, the constant switch 11, and the current winding judging section 101.

Modification Example 1 is effective in a case where better energy efficiency of the AC electric motor 40 can be obtained by consistently using the low speed winding in the hysteresis region when switching from low speed to high speed.

Modification Example 2

In characteristics of the AC electric motor 40 in the hysteresis region, when the low speed winding has higher energy efficiency than the high speed winding, the winding determining section 104 may determine the low speed winding to be the optimal winding in the hysteresis region. Note that, in this structure, it is preferred to store a case where the low speed winding is not optimal even in the hysteresis region, in the table in advance. Thus, even in the hysteresis region, it is possible to switch to the high speed winding in consideration of energy efficiency.

Figures 11A, 11B:
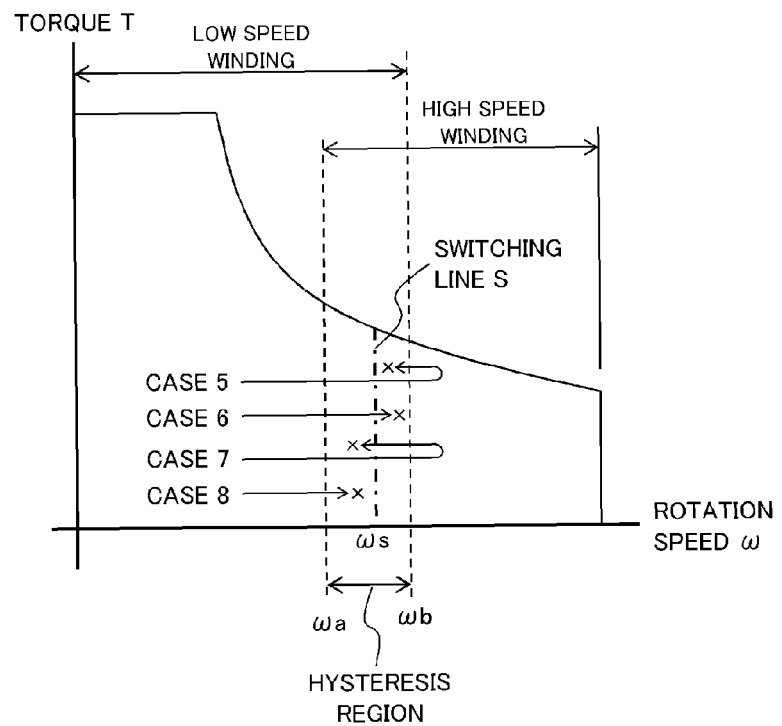
FIG. 11A is a diagram for describing a method of determining the optimal winding.
FIG. 11B is a diagram for describing a method of determining the optimal winding.

In the above description, a method of determining the optimal winding on the basis of the rotation speed ω and the torque T of the rotor of the AC electric motor 40 is exemplified. However, the method of determining the optimal winding is not limited to this method. For instance, it is possible to determine the optimal winding on the basis of the rotation speed ω without considering the torque T. FIGS. 11A and 11B show a table (FIG. 11A) and a map (FIG. 11B) for determining the optimal winding on the basis of the current winding, the rotation speed ω, and the power supply voltage V. Note that, the map shown in FIG. 11B indicates a case where the power supply voltage V is Vb, for example. In the map of FIG. 11B, unlike the map shown in FIG. 6, the switching line S is set to a predetermined rotation speed ωs. FIG. 11B shows Cases 5 to 8 as examples of the drive pattern of the AC electric motor 40, which correspond to Cases 5 to 8 in the table of FIG. 11A. The table of FIG. 11A is prepared on the basis of the map of FIG. 11B.

In Case 5, the drive pattern is the same as that in Case 1 of FIG. 6, and the high speed winding is determined to be the optimal winding. In Case 6, the drive pattern is the same as that in Case 2 of FIG. 6, and the high speed winding is determined to be the optimal winding. In Case 7, the drive pattern is the same as that in Case 3 of FIG. 6, and the low speed winding is determined to be the optimal winding. In Case 8, the drive pattern is the same as that in Case 4 of FIG. 6, and the low speed winding is determined to be the optimal winding.

In addition, as described above, it is preferred to consider the power supply voltage V for determining the optimal winding. Specifically, it is possible to adopt a structure in which the optimal winding is determined on the basis of the map (see FIGS. 6 and 11B) corresponding to a value of the power supply voltage V. For instance, when the power supply voltage is 320 V, the optimal winding is determined on the basis of the map prepared for 320 V. When the power supply voltage is 360 V, the optimal winding is determined on the basis of the map prepared for 360 V. Note that, when the power supply voltage is 340 V, it is possible to calculate an average value from the map for 320 V and the map for 360 V so as to determine the optimal winding.

(Structure of Constant Output Controller 8)

A specific structure of the constant output controller 8 is described with reference to FIG. 12. FIG. 12 is a block diagram illustrating the structure of the constant output controller 8. As illustrated in FIG. 12, the constant output controller 8 includes an amplitude calculator 81, a subtractor 82, a PI controller 83, a limiter 84, and a filter 85.

The amplitude calculator 81 calculates an amplitude value (voltage amplitude value) of the voltage command for the AC electric motor 40 on the basis of the d-axis voltage command Vd_ref and the q-axis voltage command Vq_ref output from the current controller 3, and outputs the calculated amplitude value as a voltage feedback value Vfb to the subtractor 82.

The subtractor 82 subtracts the voltage feedback value Vfb from a limit voltage command and outputs the subtracted result to the PI controller 83. In this case, the limit voltage command is determined on the basis of the DC voltage value output from the voltage detector 7. For instance, the limit voltage command may be the DC voltage value itself output from the voltage detector 7 or may be a value obtained by multiplying the DC voltage value by a predetermined coefficient.

The PI controller 83 performs control including P control or I control on the subtracted result by the subtractor 82 and operates so that the voltage feedback value Vfb does not exceed the limit voltage command. In order to achieve this purpose, the limiter 84 limits the output of the PI controller 83 to be zero when the output is a positive value and limits the output of the PI controller 83 to a predetermined value when the output is a negative value, so as to output the result to the filter 85. The output value of the limiter 84 is output as the constant output amount Id_refc to the current command calculator 2 via the filter 85. Note that, it is possible to eliminate the filter 85 so as to make the output of the limiter 84 be the constant output amount Id_refc.

(Structure of Current Controller 3)

Figure 13:
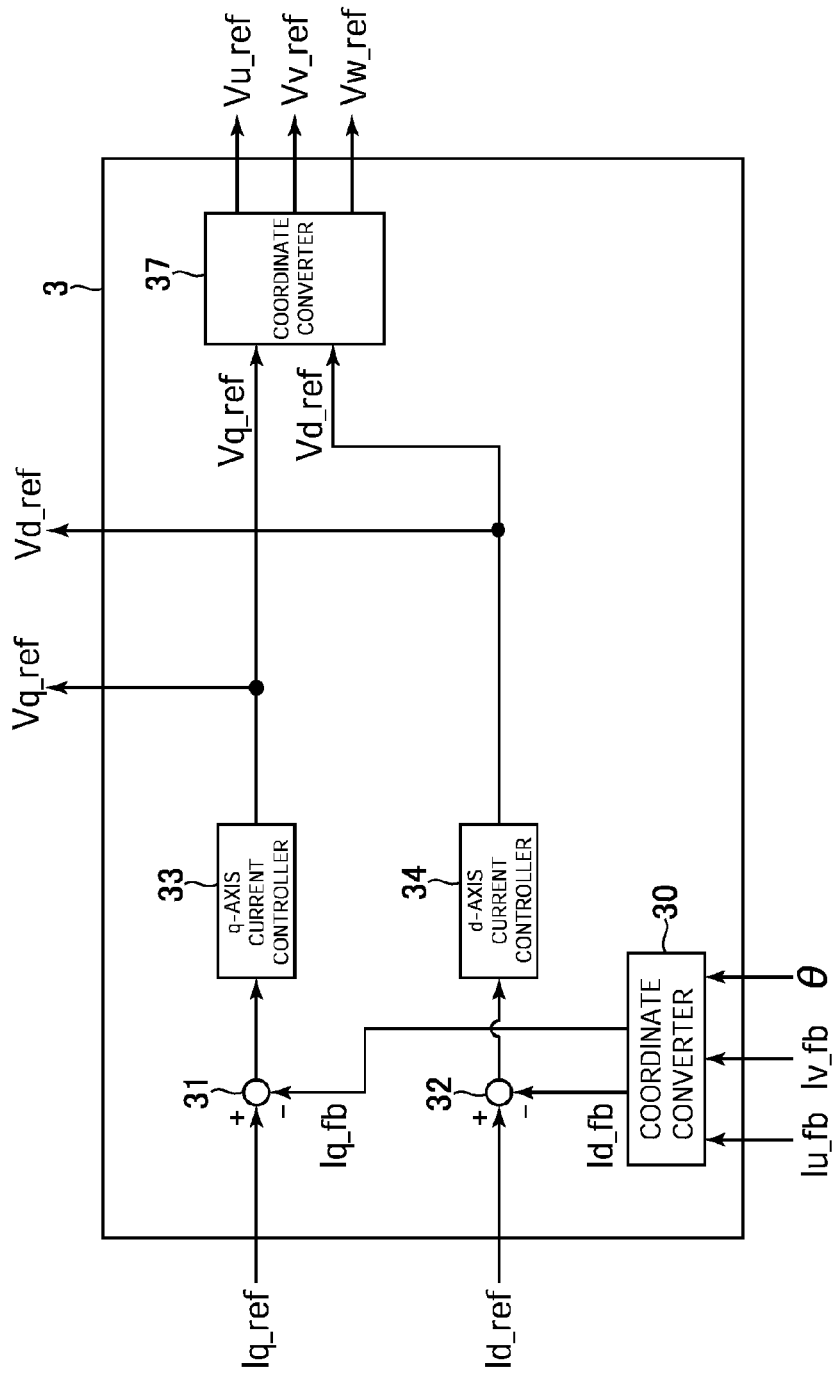
FIG. 13 is a block diagram illustrating a structure of a current controller.

A specific structure of the current controller 3 is described with reference to FIG. 13. FIG. 13 is a block diagram illustrating the structure of the current controller 3. As illustrated in FIG. 13, the current controller 3 includes a coordinate converter 30, subtractors 31 and 32, a q-axis current controller 33, a d-axis current controller 34, and a coordinate converter 37.

The coordinate converter 30 performs coordinate conversion on the detected values Iu_fb and Iv_fb of the current detector 5 output from the A/D converter 6 using a phase θ of the rotor, and generates the current feedback values Id_fb and Iq_fb.

The subtractor 31 is a processor that subtracts the q-axis current feedback value Iq_fb from the q-axis current command Iq_ref output from the current command calculator 2 and outputs the subtracted result to the q-axis current controller 33. In addition, the subtractor 32 is a processor that subtracts the d-axis current feedback value Id_fb from the d-axis current command Id_ref output from the current command calculator 2 and outputs the subtracted result to the d-axis current controller 34.

The q-axis current controller 33 and the d-axis current controller 34 are controllers that respectively control the subtracted results by the subtractor 31 and the subtractor 32 to be zero. The q-axis current controller 33 and the d-axis current controller 34 output the voltage commands Vd_ref and Vq_ref as control results to a coordinate converter 39 and the constant output controller 8.

The coordinate converter 39 is a processor that converts the voltage commands Vd_ref and Vq_ref into the U-phase, V-phase, and W-phase voltage commands Vu_ref, Vv_ref, and Vw_ref on the basis of the rotor phase θ, and outputs the converted voltage commands Vu_ref, Vv_ref, and Vw_ref to the PWM controller 4.

(Structure of Current Command Calculator 2)

Figure 14:
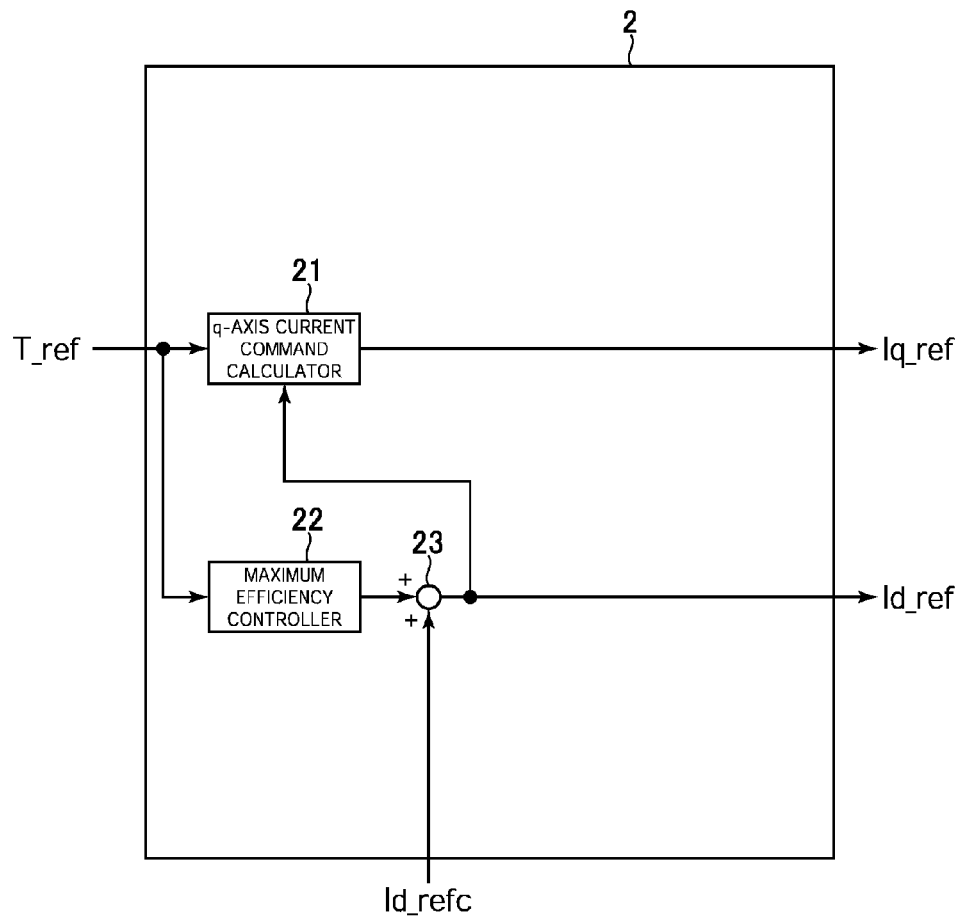
FIG. 14 is a block diagram illustrating a structure of a current command calculator.

A specific structure of the current command calculator 2 is described with reference to FIG. 14. FIG. 14 is a block diagram illustrating the structure of the current command calculator 2. As illustrated in FIG. 14, the current command calculator 2 includes a q-axis current command calculator 21, a maximum efficiency controller 22, and an adder 23.

The q-axis current command calculator 21 is a processor that calculates the q-axis current command Iq_ref on the basis of the armature flux linkage (Φ), the d-axis armature winding inductance value (Ld), and the q-axis armature winding inductance value (Lq).

The maximum efficiency controller 22 is a processor that calculates the d-axis current command Id_ref on the basis of the torque-current conversion factor (K) and the current phase (β) with respect to a q-axis direction as a direction vector perpendicular to a main magnetic flux (d-axis) direction. The d-axis current command Id_ref calculated by the maximum efficiency controller 22 is output to the adder 23. Note that, the above-mentioned K, β, Φ, Ld, and Lq are electric motor constants or control parameters, which are supplied from the constant switch 11.

The adder 23 is a processor that adds the d-axis current command Id_ref output from the maximum efficiency controller 22 to the constant output amount Id_refc. Note that, the constant output amount Id_refc is calculated by the constant output controller 8 so that values of the voltage commands (Vd_ref and Vq_ref) do not exceed the DC voltage value, and is a value corrected to the d-axis current command Id_ref. The d-axis current command Id_ref calculated by the adder 23 is output to the q-axis current command calculator 21.

The q-axis current command Iq_ref and the d-axis current command Id_ref calculated in this way are output to the current controller 3.

As the torque T used for determining the optimal winding as described above, the torque command T_ref output from the torque command generator 1 is exemplified. However, it is possible to use the torque T determined from a calculation equation such as T=Φ·Iq+(Lq−Ld)·Id·Iq. Note that, the calculation equation is not limited to this, and the Id and Iq may be current command values Id_ref and Iq_ref, or may be the current feedback values Id_fb and Iq_fb.

The above-mentioned inverter apparatus 20 may have a structure as follows.

The inverter apparatus 20 may have a structure in which the optimal winding is set on the basis of the rotation speed ω. Thus, the optimal winding can be easily determined.

The inverter apparatus 20 may have a structure in which the optimal winding is set on the basis of the rotation speed ω and the power supply voltage V. Thus, the optimal winding corresponding to the power supply voltage V can be determined.

The inverter apparatus 20 may have a structure in which the optimal winding is set on the basis of the rotation speed ω and the torque T. Thus, the optimal winding corresponding to the torque T can be determined.

The inverter apparatus 20 may have the following structure. The low speed winding is chosen when the rotation speed ω is the low speed, and the high speed winding is chosen when the rotation speed ω is the high speed. Further, the winding switching signal output section 107 does not output the winding switching signal when the rotation speed ω changes from the low speed to the high speed to enter the hysteresis region. In contrast, when the rotation speed ω changes from the high speed to the low speed to enter the hysteresis region, the winding switching signal output section 107 outputs the winding switching signal so as to switch the current winding to the optimal winding in the case where the current winding differs from the optimal winding. Thus, the low speed area can achieve driving consistently by the low speed winding.

The inverter apparatus 20 may have the following structure. The winding switching signal generator 10 includes the time judging section 106 for judging whether or not the state where the rotation speed ω is within the hysteresis region and the current winding differs from the optimal winding continues for a predetermined time. The winding switching signal output section 107 outputs the winding switching signal so as to switch the current winding to the optimal winding when it is judged that the predetermined time has elapsed. Thus, it is possible to switch to the optimal winding when the operation continues at a constant speed.

The inverter apparatus 20 may have a structure in which the winding switching signal generator 10 includes the winding determining section 104 for determining the optimal winding, and the winding determining section 104 determines one of the low speed winding and the high speed winding that has higher energy efficiency of the AC electric motor 40 corresponding to the rotation speed ω to be the optimal winding. Thus, energy efficiency of the AC electric motor 40 can be enhanced.

The inverter apparatus 20 may have the following structure. The low speed winding is chosen when the rotation speed ω is the low speed, and the high speed winding is chosen when the rotation speed ω is the high speed. The rotation speed ωa set for a first switch timing is lower than the rotation speed ωb set for a second switch timing. The winding switching signal generator 10 outputs the winding switching signal so as to switch the current winding to the high speed winding when the current winding is the low speed winding and when the rotation speed ω exceeds the rotation speed ωb set for the second switch timing. In contrast, when the current winding is the high speed winding and when the rotation speed ω falls below the rotation speed ωa set for the first switch timing, the winding switching signal generator 10 outputs the winding switching signal so as to switch the current winding to the low speed winding. Thus, the winding switch characteristics can have hysteresis characteristics.

The winding determining section 104 may have a structure in which the tables (for example, see FIGS. 5A, 5B, and 11A) are referred to for determining one of the low speed winding and the high speed winding in which energy efficiency of the AC electric motor 40 becomes optimal. Therefore, when an electric motor having different electrical characteristics is used, a table suitable for the characteristics is prepared appropriately. In other words, the AC electric motor 40 is not limited to the synchronous electric motor, but may be another electric motor such as an induction electric motor.

It should be understood by those skilled in the art that various modifications, combinations, sub-combinations and alterations may occur depending on design requirements and other factors insofar as they are within the scope of the appended claims or the equivalents thereof.

What is claimed is:
1. An inverter apparatus comprising:
a winding switching signal generator configured to output a winding switching signal having hysteresis characteristics for switch timings of a first winding and a second winding, which are determined based on a rotation speed of a rotor of an AC electric motor, to a winding switch configured to switch connection of an armature winding so that a state of the armature winding is interchangeably switched between the first winding and the second winding,
wherein the winding switching signal generator comprises:
a hysteresis region judging section configured to judge whether or not the rotation speed is within a hysteresis region defined by a first switch timing and a second switch timing;
a winding comparator configured to judge, when the rotation speed is within the hysteresis region, whether or not a current winding is the same as an optimal winding that is set in advance; and
a winding switching signal output section configured to output, when the rotation speed is within the hysteresis region and when the current winding differs from the optimal winding, the winding switching signal so that the current winding is switched to the optimal winding, and the inverter apparatus is connected to the armature winding of the AC electric motor, and is configured to control the AC electric motor.

2. The inverter apparatus according to claim 1, wherein the optimal winding is set based on the rotation speed.

3. The inverter apparatus according to claim 2, wherein:
the first winding is chosen when the rotation speed is low, and the second winding is chosen when the rotation speed is high;
the winding switching signal output section is configured to avoid outputting the winding switching signal when the rotation speed is changed from the low speed to the high speed to enter the hysteresis region; and
the winding switching signal output section is configured to output, when the rotation speed is changed from the high speed to the low speed to enter the hysteresis region, the winding switching signal so that the current winding is switched to the optimal winding when the current winding differs from the optimal winding.

4. The inverter apparatus according to claim 2, wherein:
the winding switching signal generator further comprises a time judging section configured to judge whether or not a state, in which the rotation speed is within the hysteresis region and the current winding differs from the optimal winding, continues for a predetermined time; and
the winding switching signal output section is configured to output, when being judged that the state continues for the predetermined time, the winding switching signal so that the current winding is switched to the optimal winding.

5. The inverter apparatus according to claim 2, wherein:
the winding switching signal generator further comprises a winding determining section configured to determine the optimal winding; and
the winding determining section is configured to determine one of the first winding and the second winding to be the optimal winding, which is higher in energy efficiency of the AC electric motor that corresponds to the rotation speed.

6. The inverter apparatus according to claim 1, wherein the optimal winding is set based on the rotation speed and a power supply voltage to be supplied to the inverter apparatus.

7. The inverter apparatus according to claim 6, wherein:
the first winding is chosen when the rotation speed is low, and the second winding is chosen when the rotation speed is high;
the winding switching signal output section is configured to avoid outputting the winding switching signal when the rotation speed is changed from the low speed to the high speed to enter the hysteresis region; and
the winding switching signal output section is configured to output, when the rotation speed is changed from the high speed to the low speed to enter the hysteresis region, the winding switching signal so that the current winding is switched to the optimal winding when the current winding differs from the optimal winding.

8. The inverter apparatus according to claim 6, wherein:
the winding switching signal generator further comprises a time judging section configured to judge whether or not a state, in which the rotation speed is within the hysteresis region and the current winding differs from the optimal winding, continues for a predetermined time; and
the winding switching signal output section is configured to output, when being judged that the state continues for the predetermined time, the winding switching signal so that the current winding is switched to the optimal winding.

9. The inverter apparatus according to claim 6, wherein:
the winding switching signal generator further comprises a winding determining section configured to determine the optimal winding; and
the winding determining section is configured to determine one of the first winding and the second winding to be the optimal winding, which is higher in energy efficiency of the AC electric motor that corresponds to the rotation speed.

10. The inverter apparatus according to claim 1, wherein the optimal winding is set based on the rotation speed and one of a torque command for driving the AC electric motor and a torque output from the AC electric motor.

11. The inverter apparatus according to claim 10, wherein:
the first winding is chosen when the rotation speed is low, and the second winding is chosen when the rotation speed is high;
the winding switching signal output section is configured to avoid outputting the winding switching signal when the rotation speed is changed from the low speed to the high speed to enter the hysteresis region; and
the winding switching signal output section is configured to output, when the rotation speed is changed from the high speed to the low speed to enter the hysteresis region, the winding switching signal so that the current winding is switched to the optimal winding when the current winding differs from the optimal winding.

12. The inverter apparatus according to claim 10, wherein:
the winding switching signal generator further comprises a time judging section configured to judge whether or not a state, in which the rotation speed is within the hysteresis region and the current winding differs from the optimal winding, continues for a predetermined time; and
the winding switching signal output section is configured to output, when being judged that the state continues for the predetermined time, the winding switching signal so that the current winding is switched to the optimal winding.

13. The inverter apparatus according to claim 10, wherein:
the winding switching signal generator further comprises a winding determining section configured to determine the optimal winding; and
the winding determining section is configured to determine one of the first winding and the second winding to be the optimal winding, which is higher in energy efficiency of the AC electric motor that corresponds to the rotation speed.

14. The inverter apparatus according to claim 1, wherein:
the first winding is chosen when the rotation speed is low, and the second winding is chosen when the rotation speed is high;
the winding switching signal output section is configured to avoid outputting the winding switching signal when the rotation speed is changed from the low speed to the high speed to enter the hysteresis region; and
the winding switching signal output section is configured to output, when the rotation speed is changed from the high speed to the low speed to enter the hysteresis region, the winding switching signal to switch the current winding to the optimal winding when the current winding differs from the optimal winding.

15. The inverter apparatus according to claim 14, wherein:
the winding switching signal generator further comprises a time judging section configured to judge whether or not a state, in which the rotation speed is within the hysteresis region and the current winding differs from the optimal winding, continues for a predetermined time; and
the winding switching signal output section is configured to output, when being judged that the state continues for the predetermined time, the winding switching signal so that the current winding is switched to the optimal winding.

16. The inverter apparatus according to claim 1, wherein:
the winding switching signal generator further comprises a time judging section configured to judge whether or not a state, in which the rotation speed is within the hysteresis region and the current winding differs from the optimal winding, continues for a predetermined time; and
the winding switching signal output section is configured to output, when being judged that the state continues for the predetermined time, the winding switching signal so that the current winding is switched to the optimal winding.

17. The inverter apparatus according to claim 1, wherein:
the first winding is chosen when the rotation speed is low, and the second winding is chosen when the rotation speed is high;
the rotation speed to be set for the first switch timing is smaller than the rotation speed to be set for the second switch timing;
in the case where the current winding is the first winding, when the rotation speed exceeds the rotation speed to be set for the second switch timing, the winding switching signal generator is configured to output the winding switching signal so that the current winding is switched to the second winding; and
in the case where the current winding is the second winding, when the rotation speed falls below the rotation speed to be set for the first switch timing, the winding switching signal generator is configured to output the winding switching signal so that the current winding is switched to the first winding.

18. A method of controlling an inverter apparatus comprising:
judging whether or not a rotation speed of a rotor of the AC electric motor is within a hysteresis region defined by a first switch timing and a second switch timing for switching a state of an armature winding of the AC electric motor between a first winding and a second winding;
judging, when the rotation speed is within the hysteresis region, whether or not a current winding is the same as an optimal winding that is set in advance; and
outputting a winding switching signal to a winding switch configured to switch the state of the armature winding between the first winding and the second winding so that the current winding is switched to the optimal winding when the rotation speed is within the hysteresis region and when the current winding differs from the optimal winding, and wherein
the inverter apparatus controls the AC electric motor.

19. An electric motor drive system, comprising:
an AC electric motor;
an inverter apparatus to be connected to an armature winding of the AC electric motor configured to control the AC electric motor; and
a winding switch configured to switch connection of the armature winding, wherein:
the inverter apparatus comprises a winding switching signal generator configured to output a winding switching signal having hysteresis characteristics for switch timings of a first winding and a second winding, which are determined based on a rotation speed of a rotor of the AC electric motor, to the winding switch configured to switch the connection of the armature winding so that a state of the armature winding is switched between the first winding and the second winding;
the winding switching signal generator comprises:
a hysteresis region judging section configured to judge whether or not the rotation speed is within a hysteresis region defined by a first switch timing and a second switch timing;
a winding comparator configured to judge, when the rotation speed is within the hysteresis region, whether or not a current winding is the same as an optimal winding that is set in advance; and
a winding switching signal output section configured to output, when the rotation speed is within the hysteresis region and when the current winding differs from the optimal winding, the winding switching signal so that the current winding is switched to the optimal winding; and
the winding switch is configured to switch the state of the armature winding of the AC electric motor to one of the first winding and the second winding based on the winding switching signal.

* * * * *